US012563168B2

(12) United States Patent
Díaz Lankenau et al.

(10) Patent No.: US 12,563,168 B2
(45) Date of Patent: Feb. 24, 2026

(54) ENGINEERED CUT-OUTS FOR A DISPLAY BACK LIGHT UNIT

(71) Applicant: GOOGLE LLC, Mountain View, CA (US)

(72) Inventors: Guillermo Fabian Díaz Lankenau, Santa Cruz, CA (US); Antonio Yamil Layon Halun, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/647,467

(22) Filed: Apr. 26, 2024

(65) Prior Publication Data

US 2024/0364857 A1      Oct. 31, 2024

Related U.S. Application Data

(60) Provisional application No. 63/498,584, filed on Apr. 27, 2023.

(51) Int. Cl.
H04N 13/239 (2018.01)
G02F 1/13357 (2006.01)
H04N 23/90 (2023.01)
*H04N 13/305* (2018.01)

(52) U.S. Cl.
CPC ..... H04N 13/239 (2018.05); G02F 1/133603 (2013.01); H04N 23/90 (2023.01); *H04N 13/305* (2018.05)

(58) Field of Classification Search
CPC .... H04N 13/20; H04N 13/204; H04N 13/305; H04N 13/309; H04N 23/90; G02F 1/1336; G02F 1/133602; G02F 1/133603
USPC ...................................................... 348/47–48
See application file for complete search history.

(56) References Cited

U.S. PATENT DOCUMENTS

| 2012/0250354 | A1* | 10/2012 | Yoshida | ............... | G02B 6/0091 |
| | | | | | 362/613 |
| 2020/0064676 | A1* | 2/2020 | Liang | ................ | G02F 1/133602 |
| 2021/0242350 | A1* | 8/2021 | Li | ....................... | H10D 30/6713 |
| 2022/0299701 | A1* | 9/2022 | Zhong | ........................ | C09J 7/26 |
| 2023/0411574 | A1* | 12/2023 | Hu | ...................... | H01L 21/6835 |

OTHER PUBLICATIONS

Lawrence, et al., "Project Starline: a High-Fidelity Telepresence System", ACM Trans. Graph., vol. 40, No. 6, Article 242, Dec. 2021, 16 pages. (Year: 2021).*

* cited by examiner

*Primary Examiner* — Thai Q Tran
(74) *Attorney, Agent, or Firm* — Brake Hughes Bellermann LLP

(57)      ABSTRACT
Systems and methods are described for reducing thermal distortion in an optical display for use in a 3D stereoscopic video conferencing system. The thermal distortion can arise from operation of an array of LEDs in a back light unit of the display. Forming cut-outs in the display can interrupt the flow of heat to maintain geometric stability of precision cameras mounted to the display edges while also allowing sufficient heat dissipation paths for the LEDs. Structural reinforcement bars can be added, and an opaque film can be used to block light loss from the LEDs.

20 Claims, 9 Drawing Sheets

100

110

106
104
102
112
104 z x ⊙ → y

212 z x ◄—●y

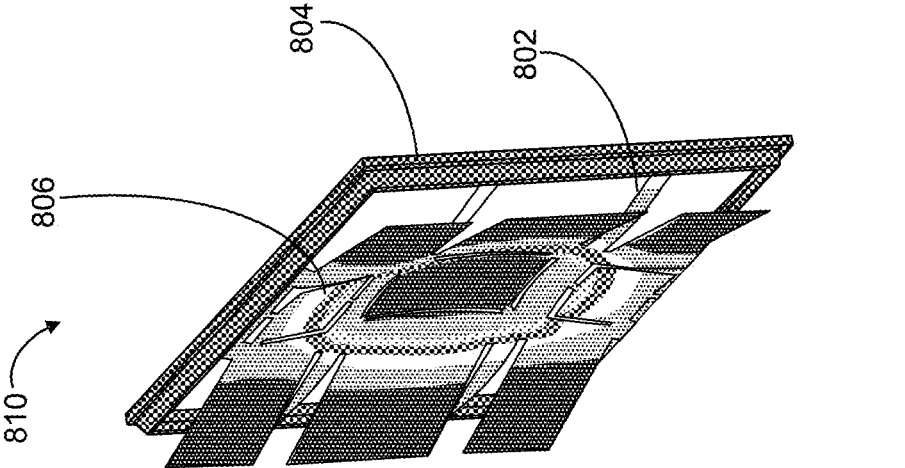
FIG. 8B
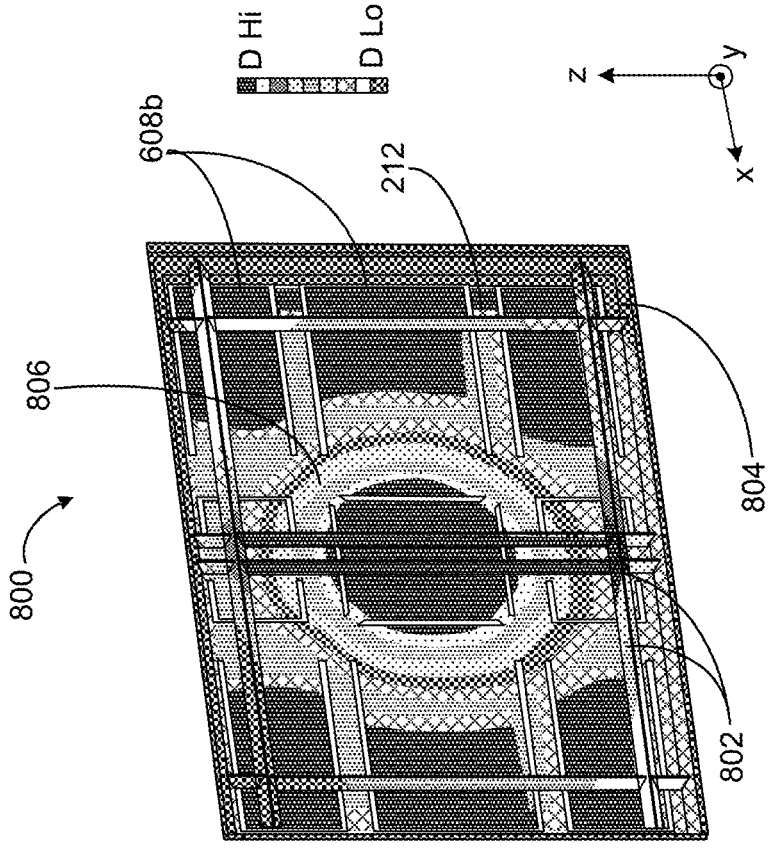
FIG. 8A

900

902
Form an optical display having a metal backplate

904
Embed LEDs in the metal backplate

906
Form cut-outs around a perimeter of one or more LEDs in the metal backplate

908
Mount multiple cameras to optical display

910
Attach structural reinforcement bars to the backplate

912
Cover cut-outs with opaque material

ENGINEERED CUT-OUTS FOR A DISPLAY BACK LIGHT UNIT

CROSS-REFERENCE TO RELATED APPLICATION

This patent application claims the benefit of U.S. patent application No. 63/498,584 filed on Apr. 27, 2023, and titled "Engineered Cut-outs for a Display Back Light Unit," which is incorporated by reference herein in its entirety.

FIELD OF THE DISCLOSURE

The present disclosure relates to a system for three-dimensional (3D) video communication with improved image quality.

BACKGROUND

Video communication systems, e.g., systems used for video conferencing or video chats, facilitate collaboration in real space. However, some aspects of non-verbal communication, such as subtle facial expressions or body language can still be lost, which can compromise the quality of the interaction. Augmented reality (AR) or virtual reality (VR) systems can deliver a more comprehensive user experience, but they require users to wear headsets that transition the user from their natural environment into an immersive virtual space.

SUMMARY

The present disclosure describes methods and systems for improving image quality in a 3D video communication system, by removing material from a display backplate in the vicinity of LEDs.

In some aspects, the techniques described herein relate to a system, including: a stereoscopic display including a back light unit (BLU) and a metal backplate; a camera mounted to the stereoscopic display to create a three-dimensional effect; light emitting diodes (LEDs) formed in the BLU; and cut-outs formed in the metal backplate.

In some aspects, the techniques described herein relate to a method, including: forming an optical display having a metal backplate; embedding LEDs in the metal backplate; forming cut-outs in the metal backplate around a perimeter of one or more of the LEDs; and mounting multiple cameras to the optical display.

In some aspects, the techniques described herein relate to a backplate for an optical display, the backplate including: a metal structure configured to support the optical display; LEDs embedded in the metal structure; and cut-outs formed in the metal structure around one or more of the LEDs;

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIGS. 8A and 8B are simulated structural maps of an optical display that has cut-outs and reinforcement bars, according to a possible implementation of the present disclosure.

Components in the drawings are not necessarily to scale relative to each other. Like reference numerals designate corresponding parts throughout the several views.

DETAILED DESCRIPTION

Figure 1:
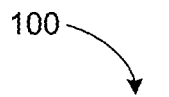
FIG. 1 is a pictorial view of a 3D video communication system according to a possible implementation of the present disclosure.
Figure 1:
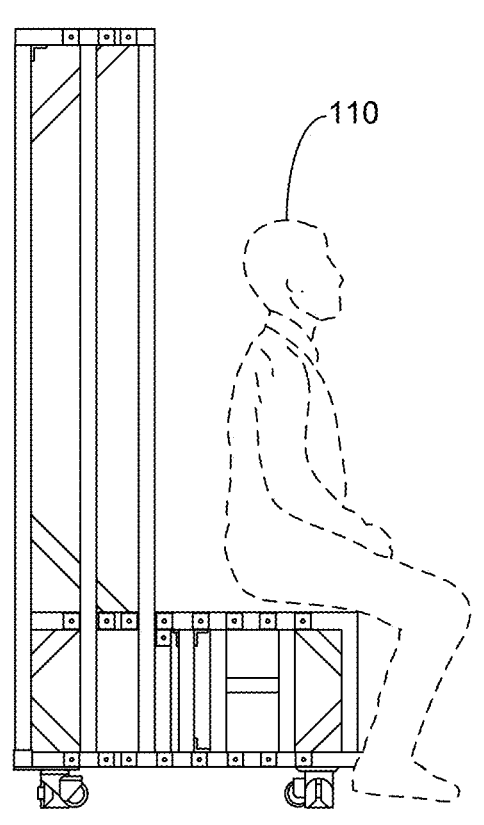
Figure 1:
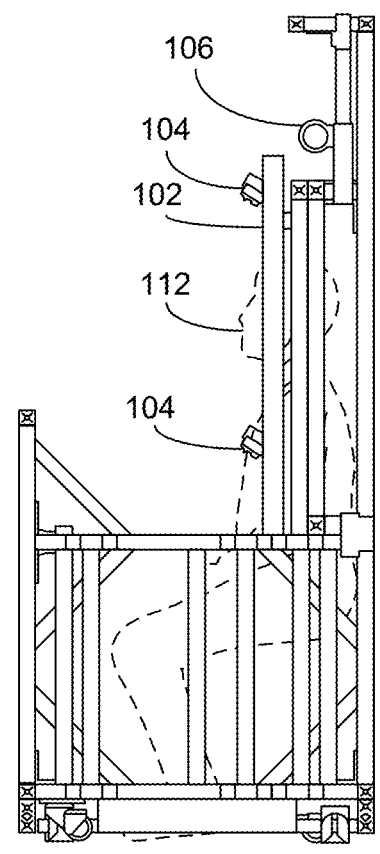
Figure 1:
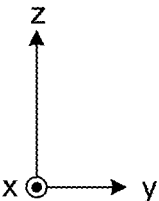

An enhanced video communication system is possible in which a user's image is presented as a 3D model, without a need to wear an AR/VR headset. In the enhanced video communication system, for example, each user sits in a booth facing a light field display that includes a projection system and an array of cameras and lights directed at different angles. The light field display projects a 3D, hologram-like, life-size image of the user, for viewing by other, remote users. With such an arrangement, the video communication experience feels more realistic because the 3D imaging provides live volumetric capture that transmits body language and subtle facial expressions, not just a flat image of a "talking head." Consequently, remote users can feel as though they are in the same room together.

3D lightfield displays can produce an autostereoscopic effect that enables an observer to perceive image depth (3D) without wearing special headgear. A stereoscopic effect can be created by a projection system that positions copies of an image in front of a user's left eye and right eye that are shifted horizontally relative to each other. An example 3D lightfield display uses lenticular optics to provide the autostereoscopic effect. The lenticular optics may be implemented as a series of vertically-oriented cylindrical camera lenses formed on a sheet, e.g., a lenticular film, that is fitted onto a display screen, to form an integrated 3D camera system. In some implementations, the lenses are formed as a 2D matrix covering the area of the display screen. In some implementations, the lenses are formed around an outer bezel of the display screen. In either arrangement, presenting and/or recording 3D video content requires the camera optics to be located with high precision relative to one another for the entirety of the video session.

At least one technical problem with such 3D light field displays that combine multiple video feeds into a composite 3D image is that the video quality is diminished if the position of any one of the cameras varies. Slight changes in camera position can result from geometric distortion of the lenticular film, resulting in flickering or jumping, or blurred features in the composite image. Such a geometric distortion can be thermally induced. That is, localized heating of the display can occur due to the operation of light emitting diodes (LEDs) and/or other electronic components, or even by sunlight incident on the display. LEDs can raise the temperature of the backplate of a display in the vicinity of the LED, from room temperature (e.g., about 25 degrees C.) to about 75 degrees C. Such heating causes structural components of the display to expand, Often, the expansion is uneven, which can cause warping as well. Consequently, existing commercial displays, used as computer monitors or televisions, lack the precision and the thermally stable geometry needed to sustain performance of the lenticular film, for high quality 3D video communication. Such displays are therefore not viable for hyper-realistic telepresence systems. For a camera projected at a distance of 1.2 m, camera motion is desirably less than about 200 μm, or the size of one display pixel. Currently available displays can experience about 0.1 mm to about 1.0 mm of relative motion between fixed points on the display.

The disclosed systems and methods provide a technical solution to thermally induced camera motion by forming cut-outs in the backplate to interrupt transmission of heat from the LED, through the backplate, to the camera locations. As used herein, for example, a cut-out is an area of the backplate where there is no material. That is, a cut-out is a hole or opening in the backplate, where backplate material either did not exist or has been removed to leave a space, hole, or opening. A cut-out may include any type of regular or irregular shape. For instance, a cut-out may be circular, square, rectangular, irregular, rhomboid, star-shaped, and the like. Cut-outs can be formed around each LED, or around groups of LEDs.

FIG. 1 shows a 3D video communication system 100 according to a possible implementation of the present disclosure. The 3D video communication system 100 includes a display 102, e.g., an optical display, onto which an array of display cameras 104 (two shown) are mounted in a precise arrangement. In some implementations, lenses of the display cameras 104 can be formed on a lenticular film attached to the display 102. Stress can alter positions of the display cameras 104 attached to the central area of the display 102 or to the perimeter of the display 102. Additionally, or alternatively, a frame camera 106 and/or light can be mounted on a separate frame above, below, or adjacent to the display 102.

A local user 110 can be seated opposite the display 102, to observe a 3D image 112 of a remote user. The local user 110 can be seated a few feet from the display 102, at a distance that would normally separate two people meeting together in the same room. The multiple display cameras 104 and the frame camera(s) 106 are focused simultaneously on the local user 110 to provide the remote user with a similar 3D image of the local user 110.

Figure 2:
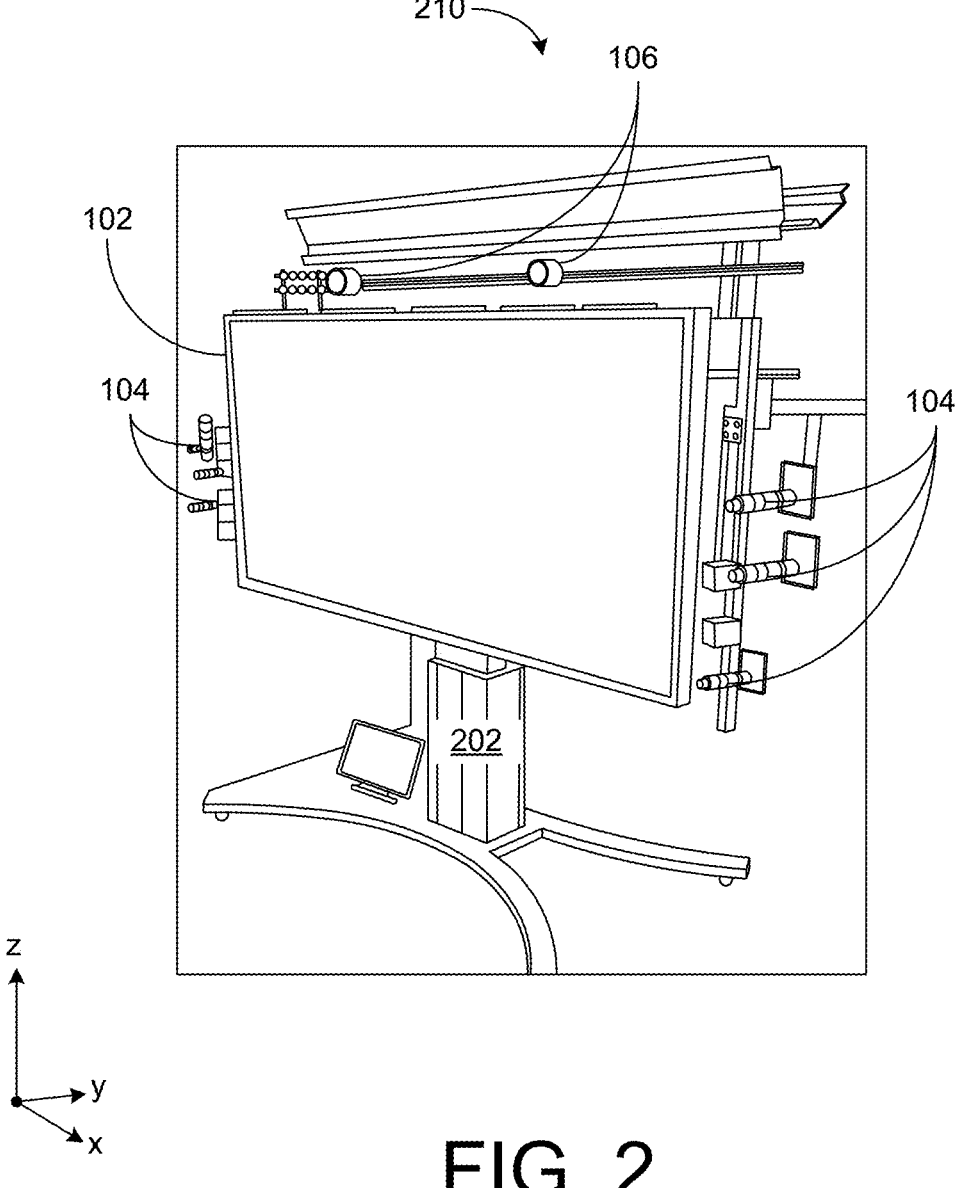
FIG. 2 is a perspective view of a front side of a 3D light field display according to a possible implementation of the present disclosure.

FIG. 2 shows a front view 200 of a prototype of the display 102, according to a possible implementation of the present disclosure. In FIG. 2, display cameras 104 (5 shown) are arranged around a perimeter, e.g., on a bezel, of the display 102. The display 102 can be supported by a frame 202. In some implementations, frame cameras 106 (2 shown) can be mounted to the frame 202, above, below, or to the sides of the display 102.

One of the challenges of the 3D video communication system 100 is to maintain accurate camera positions to successfully combine the video feeds from the various cameras. If the camera positions vary with respect to one another, the video image quality is diminished as the overlay of the video images becomes mis-aligned. While the display cameras 104 are subject to variations in their positions, even if the frame cameras 106 remain stationary, the relative positions of the various cameras may still vary.

In some implementations, a choice of materials used in the display 102 or in the frame 202 can minimize thermal distortions, for example, by substituting carbon fiber for aluminum. However, making such substitutions can add significant expense in manufacturing, design, and materials. In some implementations, reducing ambient temperature variation from heat sources or exposure to sunlight can reduce thermal distortion. However, such environmental solutions would limit where the 3D video communication system 100 can be installed and are therefore impractical.

Figure 3:
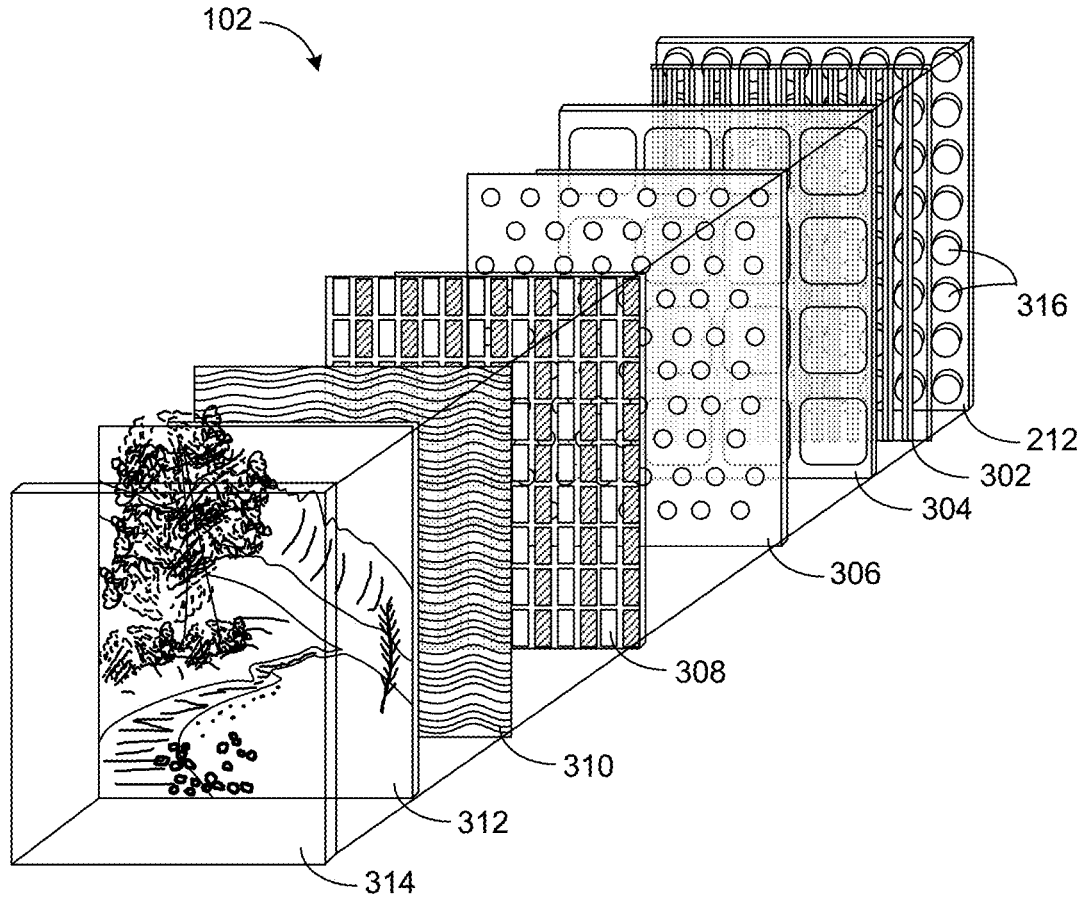
FIG. 3 is an exploded view of different layers of an optical display, according to a possible implementation of the present disclosure.

FIG. 3 is an exploded view showing various layers of a light field display, e.g., the display 102, according to a possible implementation of the present disclosure. The display 102 can include, for example, a backplate 212, a first polarizing layer 302, a thin film transistor (TFT) layer 304, a liquid crystal display (LCD) layer 306, a color filter layer 308, a second polarizing layer 310, a picture layer 312, and a cover 314. The backplate 212 includes LEDs 316 as light sources for the display 102. The LEDs can be arranged as a matrix array that occupies a large portion of the area of the display 102 so as to form a light field display. The first polarizing layer 302 can be placed adjacent to the LEDs 316. The first polarizing layer 302 can be, for example, a glass filter having a polarizing film deposited thereon. The TFT layer 304 can be placed adjacent to the LCD layer 306. The color filter layer 308 can be inserted on top of the LCD layer 306. The second polarizing layer 310 can be inserted next to the color filter layer 308. The picture layer 312 is where the projected image is formed. The cover 314 can be a glass layer that protects the picture layer 312.

Figures 4A, 4B:
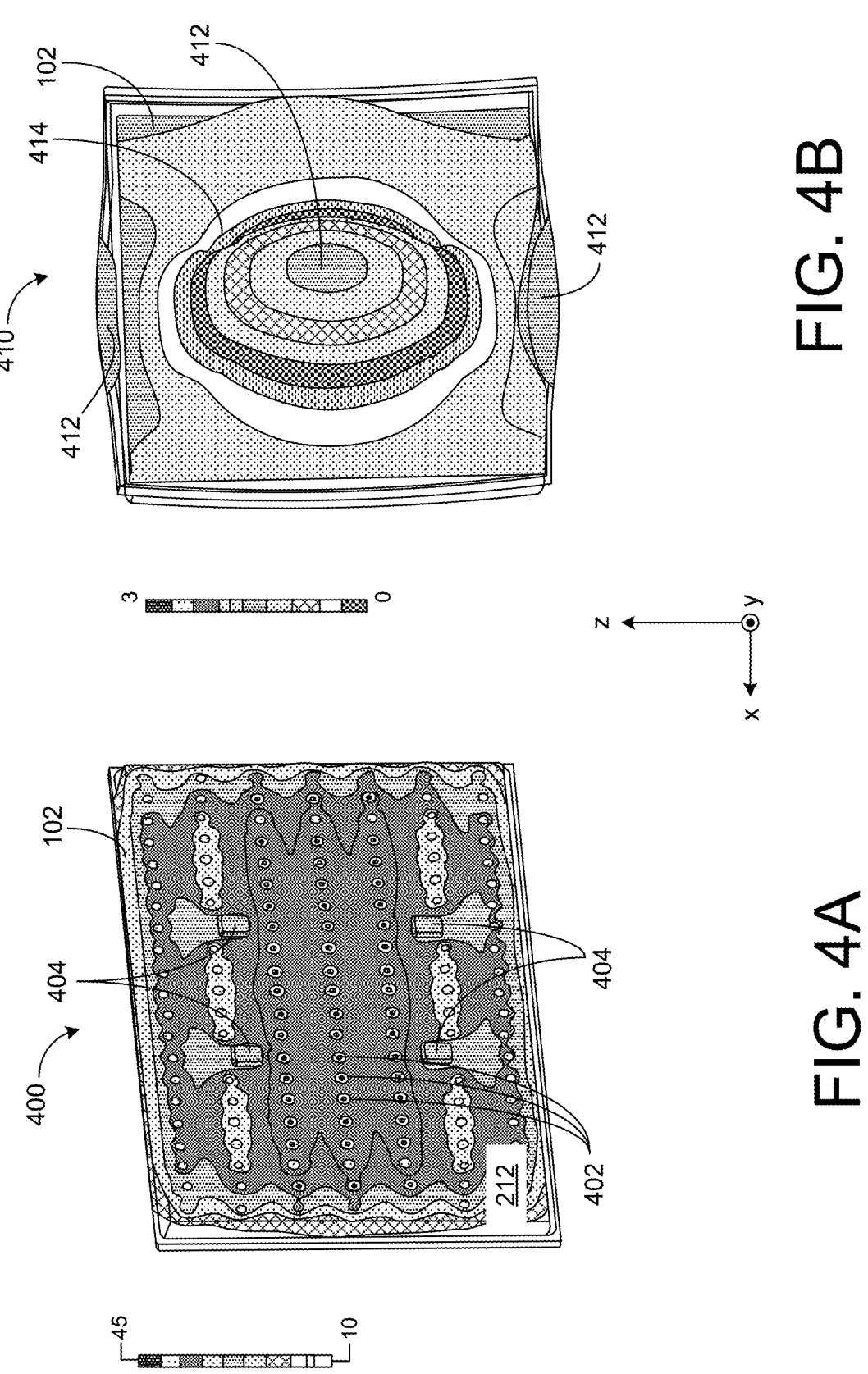
FIG. 4A is a plan view of a rear side of a 3D light field display according to a possible implementation of the present disclosure.
FIG. 4B is a simulated thermal map of a backplate of an optical display, according to a possible implementation of the present disclosure.

FIG. 4A is a simulated thermal map 400 of a front side of the backplate 212, according to a possible implementation of the present disclosure. The thermal map 400 illustrates thermally induced expansion of the backplate 212. In some implementations, the backplate serves as a heat sink as well as structural support for the display 102. In some implementations, the backplate 212 is made of structural steel to minimize bending, or buckling, in response to temperature cycling, wherein surfaces of the steel backplate 212 may radiate heat with an emissivity in a range of about 0.3 to about 0.7.

The thermal map 400 shows a steady state temperature profile of the backplate 212, in accordance with simulation results. Display mounting points 404 are also indicated on the thermal map 400 (four shown). The display mounting points 404 are locations of holes on raised surfaces near the center of the display where a stand or a wall mount can be attached to the backplate 212. Locations of the mounting points define load paths between the mounting points and the cameras that are mounted to the display, e.g., to an outer frame of the display. Cameras can include an optical stack, e.g., a series of lenses, that can be quite heavy.

The display mounting points 404 are locations where the backplate 212 is stiff, and therefore, as the backplate 212 heats up and expands, the fixtures remain stationary and thus they experience a high degree of strain and may exhibit bending or buckling due to the inherent normal stiffness of thin metal plates. The buckling results in larger motion at the edge of the display than would be expected from linear expansion. That is, the display edge motion, around the bezel where the cameras are mounted, is exaggerated by the rigid fixturing used on displays.

The thermal map 400 indicates point hot spots 402 corresponding to internal electronic components within the display 102, adjacent to the backplate 212. For example, the point hot spots 402 can be locations on the backplate 212 that coincide with a heat source. Such point hot spots 402 may rely on the backplate as a heat sink to dissipate, or spread out, heat from the point hot spots 402 so the backplate can radiate the heat, thereby cooling off the point hot spots 402. In some implementations, the point hot spots 402 can correspond to locations of the LEDs 316 within the display 102, of which there may be, for example, 200 to 400 LEDs per display, arranged in rows. In some implementations, the point hot spots 402 are hotter near the center of the display 102 than at the edges. In some implementations, an average temperature change ΔT, associated with hot spots 402 can be about 28.5 degrees C., as predicted by a simulation used to generate the thermal map 400.

FIG. 4B is a simulated deformation map 410 of a front side of the backplate 212, according to a possible implementation of the present disclosure. The deformation map 410 shows a static structural profile of the display 102, in accordance with simulation results, using finite element analysis (FEA). The deformation map 410 indicates thermal distortions 412 (three shown), at the center of the display 102, and at central portions of the top and bottom edges of the display 102. The thermal distortion 412 located at the center of the display 102 coincides with the most extreme point hot spots 402. In some implementations, a deformation-free region 414, e.g., a circular region, may exist.

Figure 5:
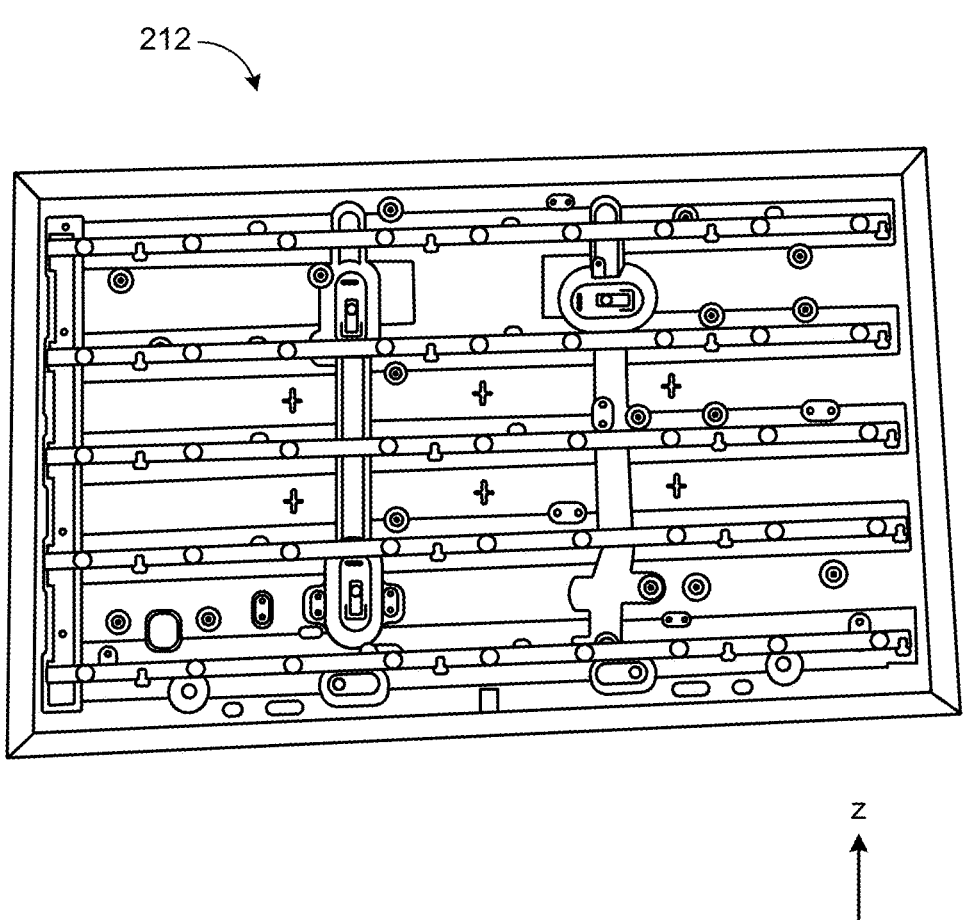
FIG. 5 is a plan view of a rear side of a backplate of an optical display, according to a possible implementation of the present disclosure.

FIG. 5 shows a rear side of the backplate 212, according to a possible implementation of the present disclosure. The backplate 212 can be stamped from sheet metal, e.g., including materials such as steel, aluminum, or various metal alloys. Other suitable metals can also be used for the backplate 212. An array of LEDs is embedded in the backplate 212. The array can include, for example, between 200 and 400 LEDs. The backplate 212 serves as a heat sink for LEDs and a structure for the overall optical display shown in FIG. 2, which includes the elements shown in FIG. 3. The backplate 212 can support a significant weight. In addition, for a 3D display, cameras can be mounted to the backplate 212, e.g., around a perimeter (bezel) of the backplate 212, or on a surface of the backplate 212. It is desirable to protect the cameras from thermal distortion of the sheet metal of the backplate 212, to reduce camera motion so that relative distances between the cameras remain substantially constant during use. The thermal distortion can be caused by heat sources, e.g., internal heat sources such as the LEDs, or external heat sources in the environment of the display 102. In some implementations, each LED can emit power in the form of heat, in a range of about 0.9 W to about 1.1 W, for a total of about 300 W of heat emitted by the LED array.

Figures 6A, 6B:
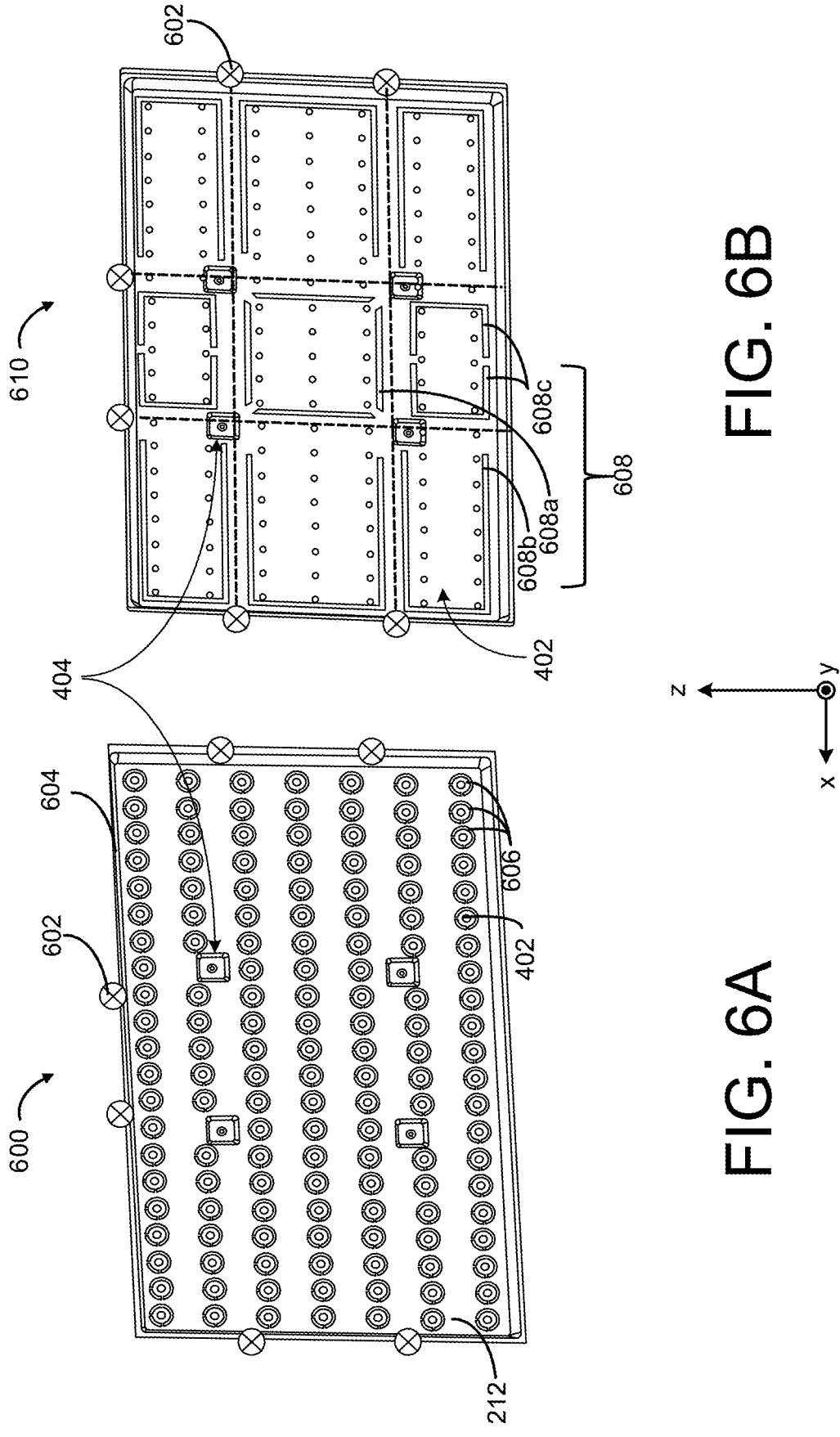
FIGS. 6A and 6B illustrate a backplate of an optical display in which cut-outs have been made, according to a possible implementation of the present disclosure.

FIGS. 6A and 6B illustrate examples of different types of cut-outs that can be made in the backplate 212, according to a possible implementation of the present disclosure. FIGS. 6A and 6B show the backplate 212, along with point hot spots 402, display mounting points 404, desired camera locations 602, a bezel 604, circular cut-outs 606, and rectangular cut-outs 608. The circular cut-outs 606 and the rectangular cut-outs 608 are portions of the sheet metal material that are strategically removed from the backplate 212. In some implementations, the cut-outs can have shapes other than circular or rectangular, which are presented herein as examples. Cut-outs can help to separate the heat sink function of the backplate 212 from the structural function of the backplate 212. Cut-outs can be added to the backplate 212 in such a way that heat sources, e.g., LEDs in the BLU can still utilize the backplate 212 as a heat sink, while some of the heat and associated thermal expansion is blocked from being transferred to portions of the backplate 212 that are supporting cameras at camera locations 602. In some implementations, such portions include the bezel 604 around a perimeter of the display 102.

In FIG. 6A, the cut-outs, e.g., circular cut-outs 606, or partial circular cut-outs, can be made around each individual LED location that coincides with a point hot spot 402. In some implementations, the point hot spot 402 is at the center of each cut-out 606, with the cut-out being symmetric around the point hot spot 402. In some implementations, the circular cut-outs 606 can be continuous, or dis-continuous with one or more breaks. As an example, each of the circular cut-outs 606 in FIG. 6A is shown with two breaks, one at the 12:00 position and one at the 9:00 position. In some implementations, the rows of circular cut-outs 606 in the backplate 212 can be interrupted by the display mounting points 404 which may not coincide with an LED. In some implementations, an opaque film (not shown) can be disposed over the backplate 212 to cover the circular cut-outs 606 and/or the rectangular cut-outs 608. The opaque film can block light that would otherwise be lost through the cut-outs.

In FIG. 6B, cut-outs, e.g., rectangular cut-outs 608, can separate groups of LEDs into subsets with dedicated heat sink areas. In some implementations, the rectangular cut-outs 608 can encompass two or three rows of LEDs. Three variations of rectangular cut-outs 608 are shown in FIG. 6B. In some implementations, the rectangular cut-outs 608 can have the form of four-sided cut-outs 608a, with breaks at the corners of the rectangle. In some implementations, the rectangular cut-outs 608 can have the form of three-sided, or U-shaped cut-outs 608b. In some implementations, the rectangular cut-outs 608 can include back-to-back C-shaped cut-outs 608c, and so on.

In some implementations, the desired camera locations 602 and/or the display mounting points 404 can coincide with corners of the rectangular cut-outs 608 so that structural load paths between the desired camera locations 602 along the bezel 604, and structural load paths between the display mounting points 404 are maintained. That is, the structural load paths are continuous, not interrupted by the rectangular cut-outs 608, so that the cameras can be aligned with the structural load points along paths that include few, if any, cut-outs. The structural load paths are shown in FIG. 6B as dashed lines. Such a layout of rectangular cut-outs 608 can help to maintain structural stability of the backplate 212 while preventing excess heat dissipation near the desired camera locations 602.

Figure 7:
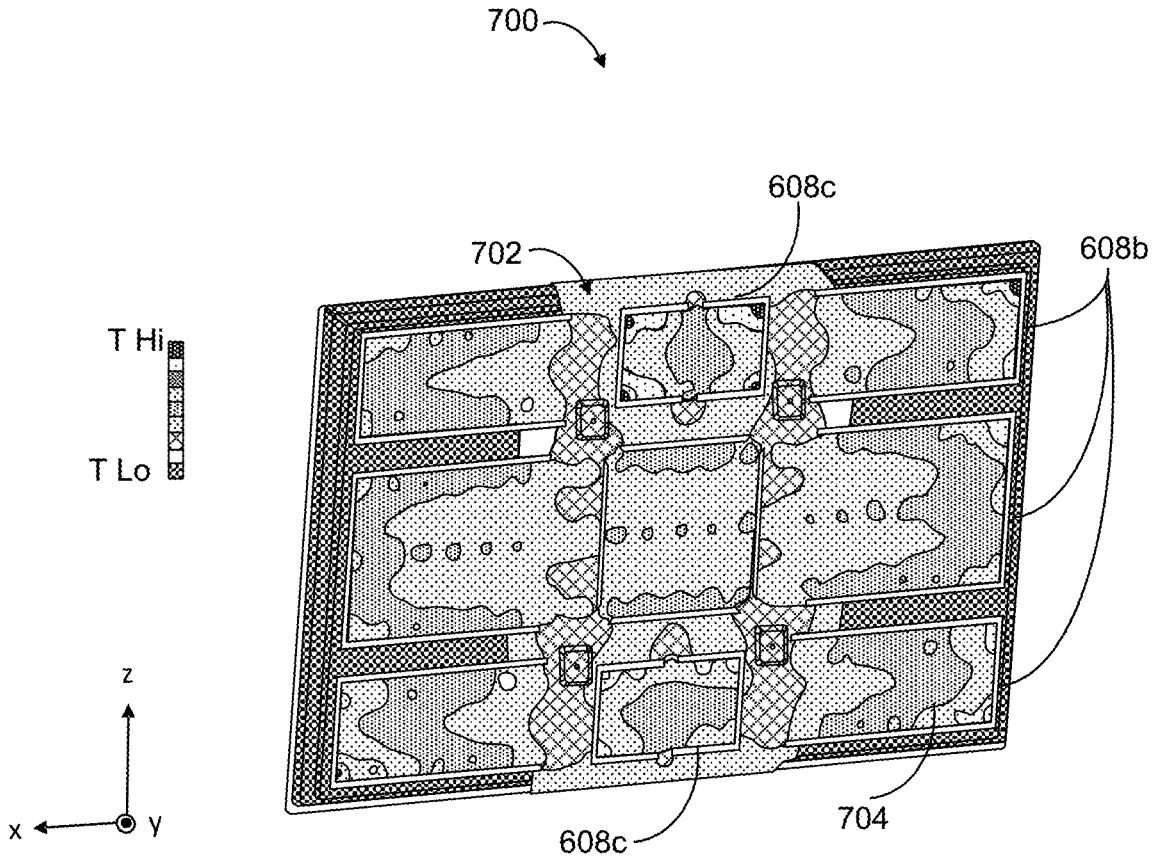
FIG. 7 is a simulated thermal map of a backplate of an optical display in which cut-outs have been made, according to a possible implementation of the present disclosure.

FIG. 7 illustrates a simulated thermal map 700 of the backplate 212 shown in FIG. 6B that includes the rectangular cut-outs 608, according to a possible implementation of the present disclosure. Temperature contours shown in FIG. 7 indicate the temperature of the backplate 212 located in a room in which the ambient temperature is at a normal room temperature of about 22 degrees C. In some implementations, the lowest temperatures 702 are shown by the simulation to be around the bezel 604 and between the U-shaped cut-outs 608b. These areas are along the load paths between the display mounting points 404 and the desired camera locations 602. In some implementations, the lowest temperatures can be maintained at about the room temperature of 22 degrees C. In some implementations, the highest temperatures 704 occur in the corners of the back-to-back C-shaped cut-outs 608c and the corners of the U-shaped cut-outs 608b, around LEDs that are not along a load path between the display mounting points 404 and the desired camera locations 602. Preliminary simulation results indicate that the effect of the temperature profiles shown in FIG. 7 is that camera motion is reduced by as much as a factor of 10, e.g., from about 2.0 mm of camera movement, or change in the camera position, to about 0.2 mm of camera movement, due to the presence of the rectangular cut-outs 608.

FIG. 8A is a simulated structural map 800 showing structural deformation (D) of the backplate 212 after adding a secondary component, e.g., reinforcement bars 802, according to a possible implementation of the present disclosure. Adding the reinforcement bars 802 to the backplate 212 is an optional improvement to further strengthen the backplate 212 after forming the rectangular cut-outs 608. The reinforcement bars 802 serve to further separate the weight-bearing structure from the BLU. The reinforcement bars 802 can be glued or welded to the backplate 212 after forming the rectangular cut-outs 608 to improve structural integrity. In some implementations, the reinforcement bars 802 are arranged as two rectangles, wherein each rectangle spans about half of the backplate 212, thus providing double reinforcement in the center of the backplate 212. In some implementations, the reinforcement bars 802 can include a frame 804 around the backplate 212 to which precision cameras, e.g., the frame cameras 106, can be mounted. The simulation corresponding to FIG. 8A was run with a parameter of zero motion amplification. The simulation indicates that regions of least deformation occur around the frame 804, and around a circle 806 that passes through the four display mounting points 404.

FIG. 8B is a simulated structural map 810 of the backplate 212 equipped with the reinforcement bars 802 and the frame 804, according to a possible implementation of the present disclosure. The simulation corresponding to FIG. 8B was run with a parameter of 30X motion amplification. In some implementations, the frame 804 and/or the reinforcement bars 802 can be thermally isolated from the backplate 212, e.g., by spacing the reinforcement bars 802 apart from, a plane of the backplate 212, as shown in FIG. 8B so that the frame 804 remains cool and relatively static in spite of the LEDs warming up and distorting regions of the backplate 212.

Figure 9:
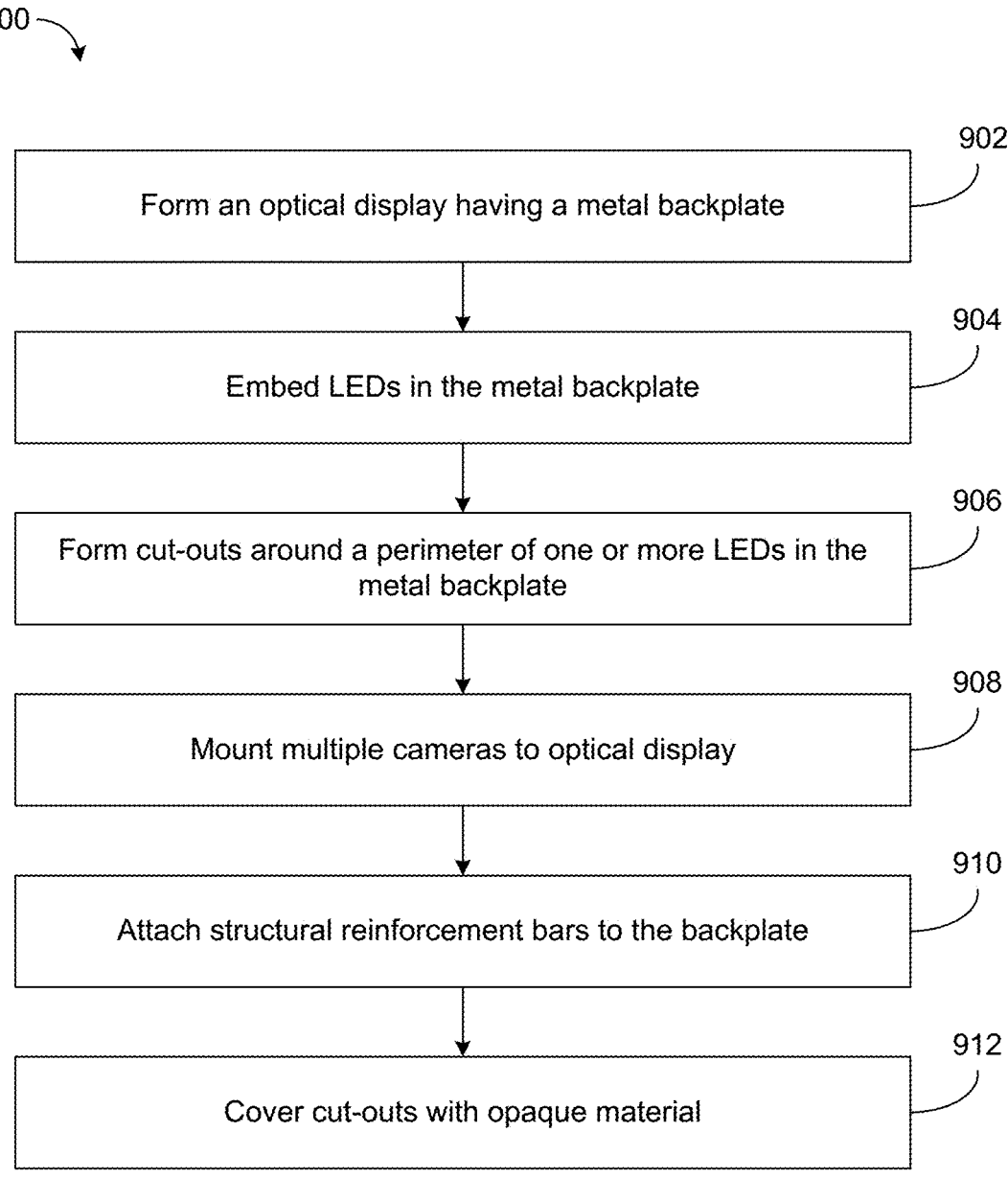
FIG. 9 is a flow chart for a method of improving image quality of a 3D light field display, according to a possible implementation of the present disclosure.

FIG. 9 illustrates a method 900 for improving image quality of a 3D light field display, according to a possible implementation of the present disclosure. Operations of the method 900 can be performed in a different order, or not performed, depending on specific applications. The method 900 may be performed using the apparatus shown in FIGS. 1, 2, 3, 4A, 4B, 5, 6A, 6B, 7, 8A, and 8B. The method 900 includes preliminary operations that occur prior to a video session. It is noted that the method 900 may improve thermal stability of the display 102 but may not completely eliminate thermal distortions affecting the display 102. Accordingly, it is understood that additional processes can be provided before, during, or after the method 900, and that some of these additional processes may be briefly described herein.

The method 900 includes, at 902, forming an optical display, e.g., the display 102, that includes the metal backplate 212, according to a possible implementation of the present disclosure.

The method 900 further includes, at 904, embedding LEDs in the backplate 212, as illustrated in FIGS. 4A and 5, according to a possible implementation of the present disclosure.

The method 900 further includes, at 906, forming cut-outs around a perimeter of one or more LEDs in the backplate 212 as shown in FIGS. 6A and 6B, according to a possible implementation of the present disclosure. The cut-outs can be in the form of, for example, circular cut-outs 606 or rectangular cut-outs 608.

The method 900 further includes, at 908, mounting multiple cameras, e.g., display cameras 104 and/or frame cameras 106 to the optical display 102, as illustrated in FIGS. 1, 2, 6A, and 6B, according to a possible implementation of the present disclosure.

The method 900 further includes, at 910, optionally attaching the structural reinforcement bars 802 to the backplate 212 as shown in FIGS. 8A and 8B, according to a possible implementation of the present disclosure.

The method 900 further includes, at 912, optionally covering the cut-outs 606 and/or the rectangular cut-outs 608 with an opaque material, according to a possible implementation of the present disclosure. The opaque material can be, for example, a film that prevents light from escaping the BLU.

The method 900 can be employed in systems other than the 3D video communication system 100, e.g., in the context of other systems that feature multiple cameras in a precise arrangement. Such systems can include, for example, smart phones that include multiple cameras, autonomous vehicles that employ cameras together with LIDAR, GPS-based mapping programs that rely on immersive street-view images, mobile robot vision systems, virtual reality (VR) experiences, video games, camera arrays used for precision motion capture, and interactive touch displays that incorporate cameras.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A system, comprising:
a stereoscopic display including a back light unit (BLU) and a metal backplate;
a camera mounted to a perimeter of the stereoscopic display to create a three dimensional (3D) effect;
light emitting diodes (LEDs) formed in the BLU;
a plurality of cut-outs formed by removing material from the metal backplate and positioned to interrupt a thermal path between one or more of the LEDs and the camera; and
an opaque material covering the plurality of cut-outs.

2. The system of claim 1, wherein the cut-outs are configured to reduce thermally-induced motion of the camera to less than 200 μm during operation of the LEDs.

3. The system of claim 1, wherein the cut-outs are configured to functionally separate heat-dissipating portions of the metal backplate from structural-support portions of the metal backplate that support the camera.

4. The system of claim 1, wherein the cut-outs comprise at least one of a three-sided, U-shaped cut-out or a C-shaped cut-out.

5. A method, comprising:
forming an optical display having a metal backplate;
embedding LEDs in the metal backplate;
forming a plurality of cut-outs by removing material from the metal backplate positioned to interrupt a thermal path between one or more of the LEDs and a plurality of camera mounting locations on a perimeter of the optical display;
mounting multiple cameras to the optical display via the plurality of camera mounting locations; and
covering the plurality of cut-outs with an opaque material.

6. The method of claim 5, further comprising attaching, to the metal backplate, reinforcement bars that are spaced apart from a plane of the metal backplate.

7. The method of claim 6, wherein attaching the reinforcement bars occurs after forming the cut-outs.

8. The method of claim 6, wherein attaching the reinforcement bars includes forming a frame around the metal backplate.

9. The method of claim 8, further comprising thermally isolating the frame from the metal backplate by spacing the frame apart from the metal backplate.

10. The method of claim 5, wherein the opaque material is a film.

11. The method of claim 5, wherein mounting multiple cameras to the optical display includes mounting multiple cameras adjacent to a bezel around a perimeter of the optical display.

12. The method of claim 5, wherein mounting multiple cameras to the optical display includes aligning the multiple cameras with structural load points along paths that do not include the cut-outs.

13. The method of claim 5, further comprising attaching reinforcement bars to the metal backplate, wherein the reinforcement bars are arranged to form two rectangular frames that provide double reinforcement to a central portion of the backplate.

14. The method of claim 8, wherein thermally isolating the frame from the metal backplate comprises creating a physical air gap by spacing the frame apart from a plane of the metal backplate.

15. A backplate for an optical display, the backplate comprising:
a metal structure configured to support the optical display and a camera mounted to a perimeter of the optical display;
LEDs embedded in the metal structure;
a plurality of cut-outs formed by removing material from the metal structure and positioned to interrupt a thermal path between one or more of the LEDs and the perimeter; and
an opaque material disposed over the metal structure to cover the plurality of cut-outs.

16. The backplate of claim 15, further comprising reinforcement bars attached to the metal structure.

17. The backplate of claim 15, wherein the opaque material is an opaque film.

18. The backplate of claim 15, further comprising display mounting points, wherein the metal structure defines continuous structural load paths between the display mounting points and camera mounting locations on the perimeter of the metal structure, and the continuous structural load paths are not interrupted by the cut-outs.

19. The backplate of claim 15, wherein the cut-outs are configured to maintain a temperature difference of at least 30 degrees Celsius between a central portion of the metal structure and the perimeter of the metal structure during operation of the LEDs.

20. The backplate of claim 15, wherein the metal structure supports a plurality of cameras forming an optical stack, and structural-support portions of the backplate are configured to support the optical stack without being subject to thermal distortion.

* * * * *